Figure 1:
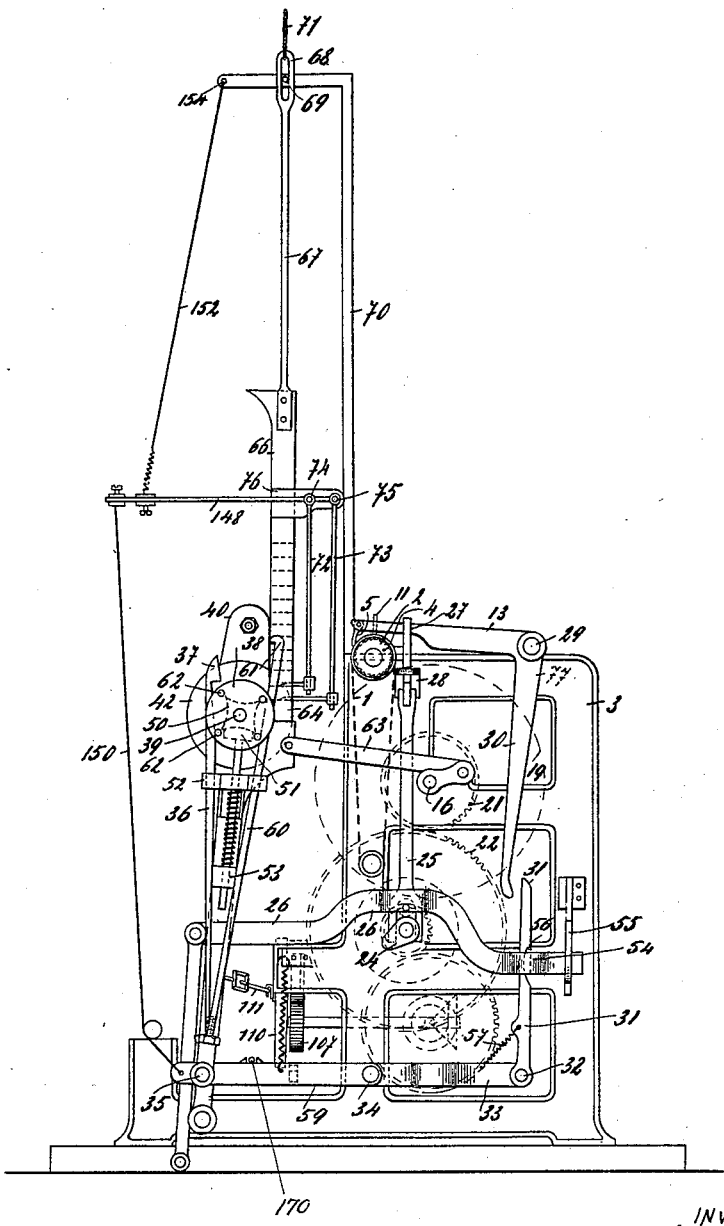

No. 682,034. Patented Sept. 3, 1901.
P. CLÉMENT.
WEFT REPLENISHING LOOM.
(Application filed Aug. 10, 1900.)

(No Model.) 6 Sheets—Sheet 1.

WITNESSES:
Ella L. Giles
Otto Munk

INVENTOR
Paul Clément
BY
Richardson
ATTORNEYS

No. 682,034. Patented Sept. 3, 1901.
P. CLÉMENT.
WEFT REPLENISHING LOOM.
(Application filed Aug. 10, 1900.)
(No Model.) 6 Sheets—Sheet 2.

WITNESSES:
Ella L. Giler
Otto Munk

INVENTOR
Paul Clément
BY
Richardson
ATTORNEYS

No. 682,034. Patented Sept. 3, 1901.
P. CLÉMENT.
WEFT REPLENISHING LOOM.
(Application filed Aug. 10, 1900.)
(No Model.) 6 Sheets—Sheet 4.

No. 682,034. Patented Sept. 3, 1901.
P. CLÉMENT.
WEFT REPLENISHING LOOM.
(Application filed Aug. 10, 1900.)
(No Model.) 6 Sheets—Sheet 5.
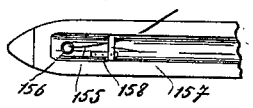
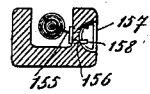
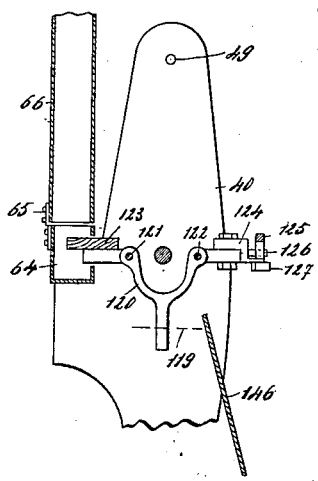
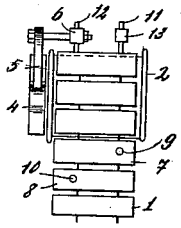
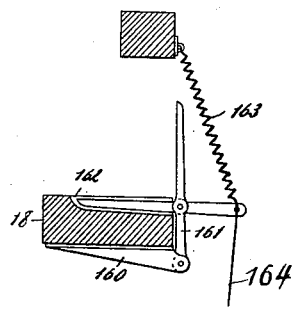
WITNESSES:
Ella L. Giles
Otto Munk
INVENTOR
Paul Clément
BY
Richards
ATTORNEYS No. 682,034. P. CLÉMENT. Patented Sept. 3, 1901.
WEFT REPLENISHING LOOM.
(Application filed Aug. 10, 1900.)
(No Model.) 6 Sheets—Sheet 6.

WITNESSES:
Ella L. Giles
Otto Munk

INVENTOR
Paul Clément
BY
Richardson
ATTORNEYS

UNITED STATES PATENT OFFICE.

PAUL CLÉMENT, OF WASQUEHAL, FRANCE.

WEFT-REPLENISHING LOOM.

SPECIFICATION forming part of Letters Patent No. 682,034, dated September 3, 1901.

Application filed August 10, 1900. Serial No. 26,478. (No model.)

*To all whom it may concern:*

Be it known that I, PAUL CLÉMENT, a subject of the King of Belgium, residing at Wasquehal, near Lille, in the French Republic, have invented certain new and useful Improvements in Weft-Replenishing Looms, of which the following is a specification.

This invention relates to looms for weaving, and comprises improved means for enabling the empty shuttle to be automatically replaced by a fresh one when the weft-thread has run out or become exhausted. The devices heretofore introduced for this purpose are generally dependent upon or are used in connection with a weft-thread feeler, which comes into action when the weft-thread breaks or runs out and by means of suitable mechanism effects the changing of the shuttle. These devices produce defective parts in the fabric, and, moreover, the mechanism actuated by the feelers can never start operating till after the loss of a pick and a half of the weft, since the feeler can only act after the first passage of the empty shuttle. According to my invention I obviate these inconveniences by effecting the substitution or changing of the shuttle after a predetermined length of thread carried by the shuttle has been used, or nearly so, this being effected by the aid of a card-chain, which is proportionate to the length of the thread upon the shuttle and arranged in such a manner as to effect, by means of mechanism hereinafter described, the changing of the shuttle between two successive picks without the loss of a single pick in the interval between the withdrawal of the empty shuttle and the coming into operation of a fresh one. To this end the card-chain is chiefly characterized by a number of cards sufficient to enable it to make one turn or complete displacement during the time occupied in using nearly the full predetermined length of the shuttle-thread and also by the provision in two successive cards of a hole or aperture, into each of which engages a lever, one of the said levers being designed to operate the mechanism for the changing of the shuttle at the moment when the latter, being empty or nearly so, leaves the shed, while the other lever is designed for operating the mechanism for immediately furnishing a fresh shuttle to the shuttle-changing mechanism. In this manner a fresh shuttle is taken up immediately after the changing operation, so as to be ready to replace the one then in use when this latter in its turn runs out. To this end I make use of an apparatus consisting, essentially, in the combination, with a mechanism for changing the shuttle and comprising a rotary drum, of a feed mechanism for furnishing a fresh shuttle to the said rotary shuttle-drum immediately after the changing of the shuttle then in use.

In order that my invention may be more clearly understood, I will now describe the same with reference to the accompanying drawings, in which—

Figure 2:
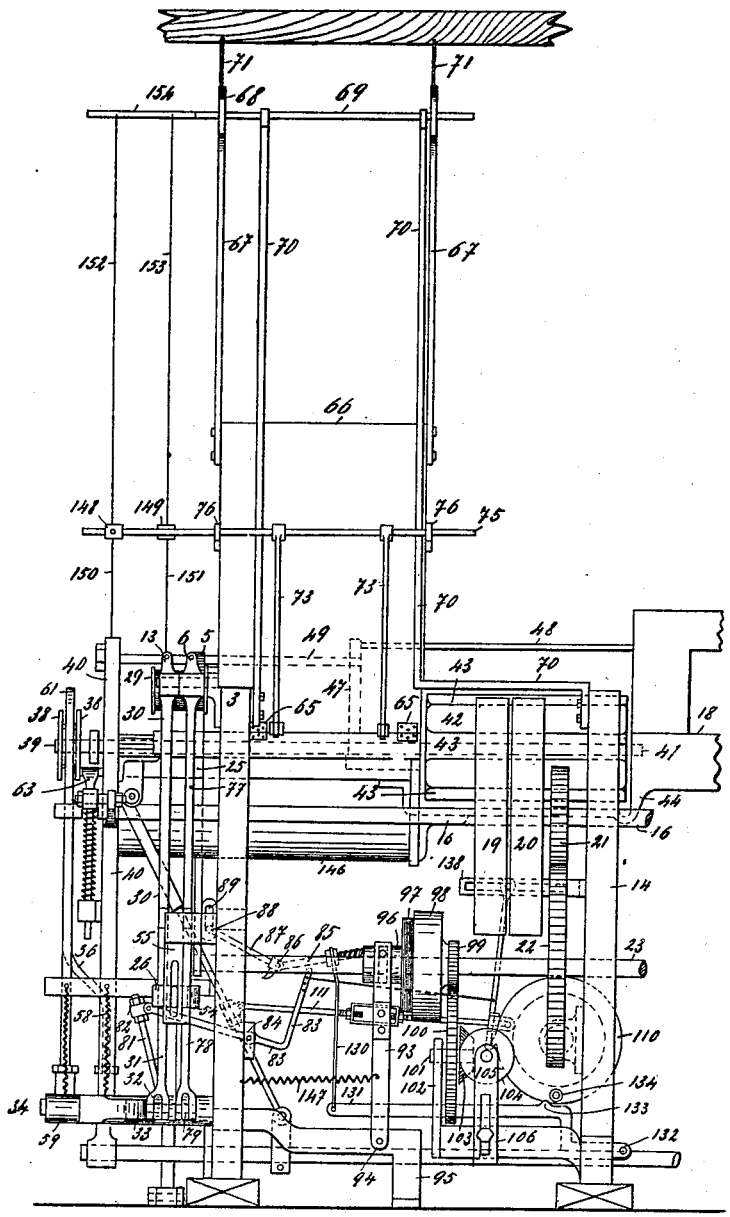
Figure 3:
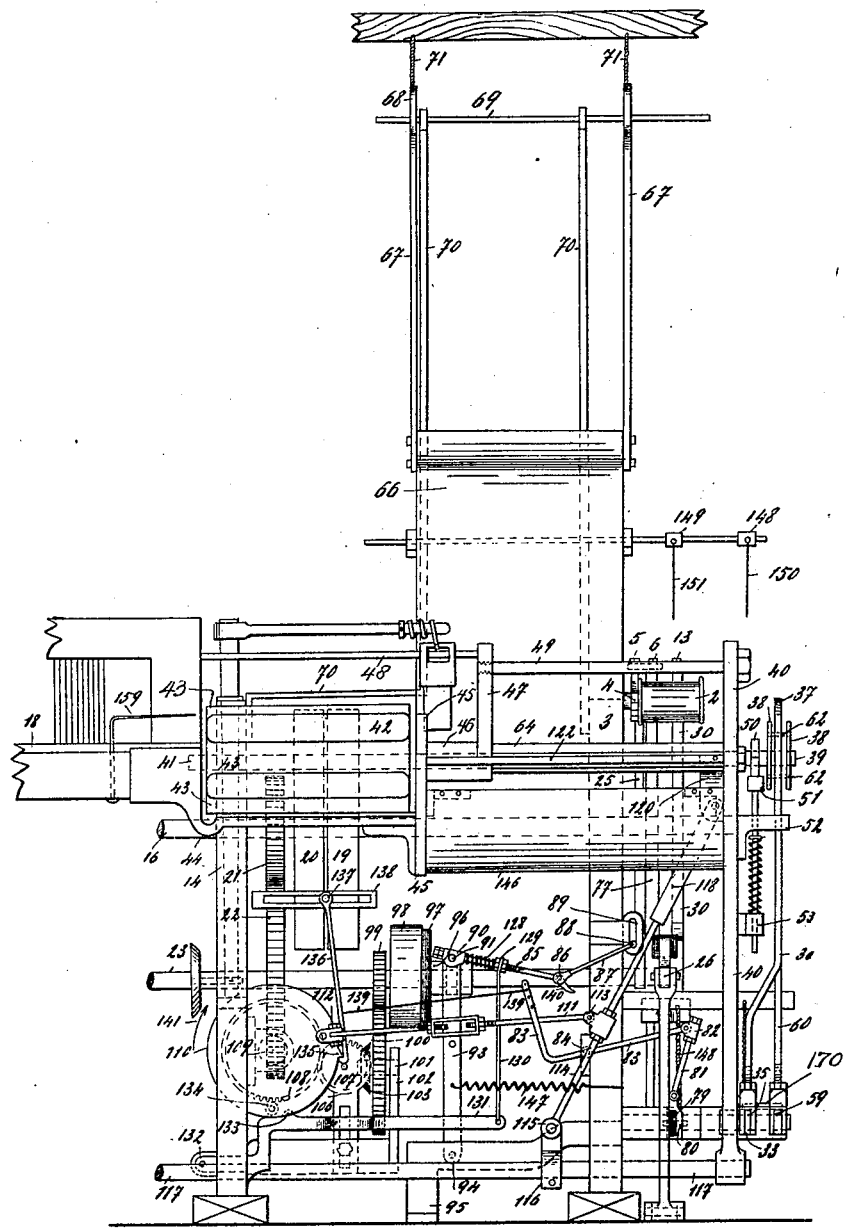
Figure 4:
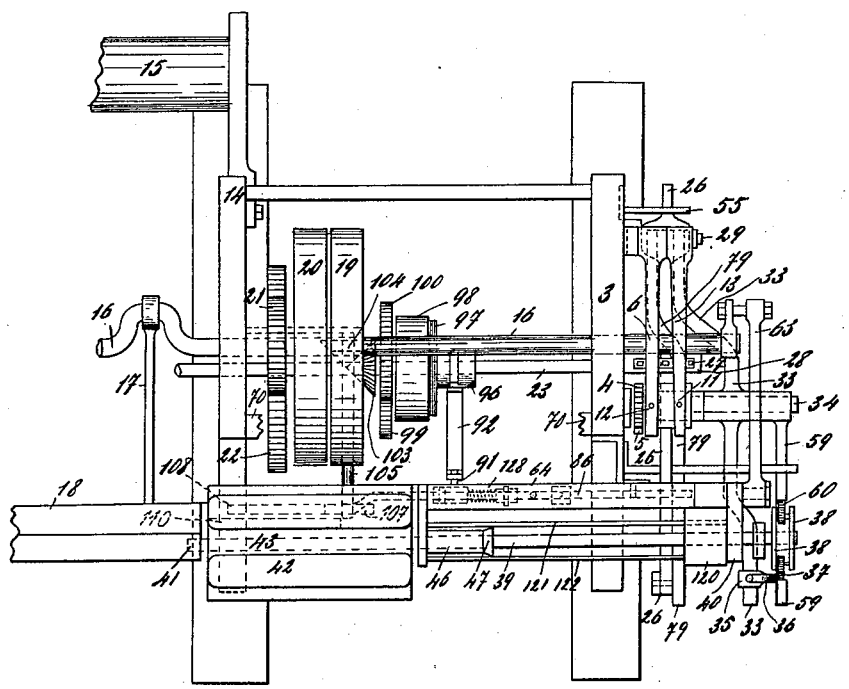
Figure 6:
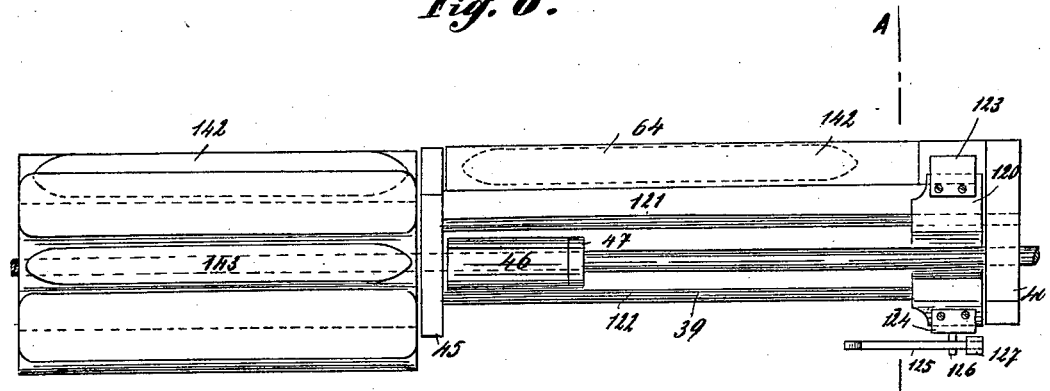
Figure 7:
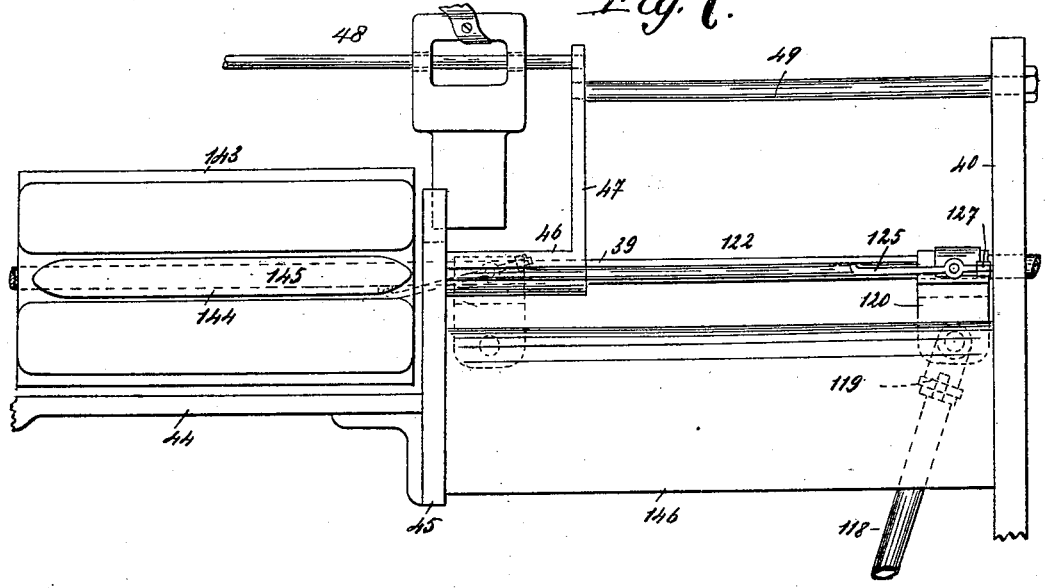

Figure 1 is an end elevation of a portion of a weaving-loom provided with my improvements. Fig. 2 is a rear elevation of a portion of the said loom, showing the mechanism for effecting the operations hereinbefore indicated. Fig. 3 is a front elevation of the said mechanism. Fig. 4 is a plan of the same. Fig. 5 is a detail showing the card-chain, the novel use of which latter constitutes an essential part of my invention. Fig. 6 is a plan, drawn to a larger scale, of a portion of the mechanism for feeding the shuttle drum or carrier of the changing mechanism. Fig. 7 is an elevation of the said feed mechanism, showing in dotted lines the manner of automatically extracting the empty shuttle from the drum. Fig. 8 is a section taken on the line A B of Fig. 6. Fig. 9 is a side elevation showing in detail the construction of the shuttle used in conjunction with my invention. Fig. 10 is a side elevation of a portion of a shuttle, showing the arrangement for retaining the end of the yarn at the first pick of the shuttle. Fig. 11 is a cross-section of the shuttle. Fig. 12 is a cross-section of the batten, showing the arrangement employed for cutting the thread still attached to the shuttle when the latter is run out, or nearly so, and requires replacing by a fresh shuttle.

As already mentioned, my invention is mainly based upon the use of a card-chain, the number of cards of which and the length of the thread carried by the shuttle are so proportioned that the card-chain completes one turn within the time required for using up the entire quantity of thread carried by the said shuttle. This card-chain 1, Figs. 1 and 5, passes around a small guide-pulley 2, fast on a rotary spindle supported in bearings in a bracked fixed to the standard 3 of the frame of the loom. Upon the spindle of the pulley 2 there is mounted a ratchet-wheel 4, Figs. 3, 4, and 5, which can be revolved by means of a pawl 5, attached to a lever 6, the purpose and operation of which will be hereinafter explained. The pulley 2 being revolved in the manner indicated and carrying with it the card-chain, it will be readily understood that if the number of cards is correctly chosen—the cards 7 and 8, Fig. 5, for example—provided with holes 9 and 10, respectively, will be caused to pass beneath pins 11 and 12, carried by levers 6 and 13, respectively, at the precise moment when the quantity of thread carried by the shuttle is exhausted. When the card 7 comes opposite the pin 11 of the lever 13, the said pin engages in the hole 9 of the card, and the motion of the lever 13 resulting from such engagement may be utilized for effecting the changing of the shuttle between two successive picks. This change having been effected by the aid of the shuttle drum hereinbefore mentioned, the next card 8 comes into position beneath the lever 6, the pin 12 of which in its turn engages with the corresponding hole 10 of the card, and the motion of this lever may also be utilized for actuating the feed mechanism designed to furnish the drum with a fresh shuttle in exchange for the one used in replacing the empty shuttle.

I will now describe the mechanism designed to effect the changing of the shuttle, including the before-mentioned drum.

Between the standards 3 and 14 of the loom Figs. 2 and 3, and adjacent to the warp-beam 15 (shown broken away in Fig. 4) is the driving-shaft 16, arranged to operate the batten 18 by means of a connecting-rod 17. Upon this shaft 16, between the standards 3 and 14 of the frame, are mounted the loose and fast driving-pulleys 19 and 20, and at the side of the pulley 20, near the standard 14, the said shaft carries a toothed wheel 21, in gear with a toothed wheel 22, keyed onto an auxiliary shaft 23, which at its extremity on the outer side of standard 3 is fitted with a cam 24, Fig. 1, adapted to act upon a vertical lever 25 and a bent horizontal lever 26, so as to lift the said levers. The lever 25 terminates at its upper end in a fork 27, Figs. 1 and 4, and is provided with a guide 28, fixed to the frame or standard 3. The fork 27 embraces the levers 6 and 13 of the cards, as shown in Figs. 1 and 4, and lifts the two levers simultaneously, so as to allow of the passage of the cards of the card-chain 1 beneath the pins 11 and 12. The lever 13, which is the only one of the two levers 6 and 13 with which we have to deal at this moment, for the reason that it alone effects the changing of the shuttle, is pivoted at 29 to the standard 3 of the frame, and it is formed with a vertical arm 30, arranged in the same plane as a lever 31, Fig. 1, pivoted at 32 to the end of a horizontal lever 33, adapted to osciliate upon a stud 34, connected at its rear end 35 to a lever 36, terminating at its upper end in a hook 37. This hook 37 is arranged between two disks 38, supported upon a rotary shaft 39, mounted at one end in an upright 40, which latter oscillates with the batten 18, and at its other end 41 in the extremity of the batten adjacent to the standard 14 of the frame of the loom. Upon this shaft 39 there is mounted near the batten 18 a drum 42, furnished, for example, with four grooves or recesses 43, designed to receive the shuttles. The batten 18 is provided with a projection 44, Figs. 2, 3, and 7, extending below the said drum and carrying immediately beyond the drum a plate 45, to which is secured a support 46, sliding upon the shaft 39 and formed with a vertical arm 47. Between this arm 47 and the batten 18 there is fixed a rod 48, serving as a guide for the shuttle-driver. A rod 49, moreover, connects the arm 47 with the upright 40, which oscillates with the batten. Upon the shaft 39, between the disks 38 and the oscillating upright 40, is keyed a stop 50, acted upon by a spring-actuated catch 51, carried by the oscillating upright 40 and guided in brackets 52 and 53, the bracket 52 at the same time serving as a guide for the lever 36. The lever 31, Fig. 1, passes through a fork or loop 54 in the horizontal lever 26, whose free end engages in a guide 55, fixed to the standard 3 of the frame of the loom. This lever 31 is formed with a recess 56, adapted to engage the upper edge of the fork 54 of the lever 26 whenever the said lever 31 is moved to the right in opposition to the spring 57, attached to the lever-arm 33, which is acted upon by a spring 58, Fig. 2. Upon the pin 34, upon which the lever 33 oscillates, there is further mounted at the exterior of the lever 33 another lever 59, pivoted at its extremity to a vertical rod 60, similar to the rod 36, previously referred to. This rod 60 is also disposed between the disks 38, keyed on the shaft 39, and terminates in a stop-hook 61. Between the disks 38 are fixed stop-pins 62, corresponding in number (four, for example) to that of the grooves or recesses 43 in the drum 42. This arrangement operates in the following manner: The working shuttle contained in the grooves 43 of the drum 42 is in the vertical plane passing through the axis of rotation 39 of the drum 42 and through the rod 48, used as a guide to the shuttle-driver. The shuttle-driver traveling along the said rod 48 drives the shuttle from the groove 43, in which it has been disposed, and into the opening of the shed, and at its return journey the said shuttle reënters the groove 43. Meanwhile the successive picks are effected, the batten is oscillated in the ordinary manner through the intervention of the crank-rod 17, Fig. 4, and an externally-arranged crank-rod 63, Figs. 1 and 4, connected to the driving-shaft 16, on the one hand, and, on the other hand, to the upright 40, which oscillates with the batten and which is secured thereto by the shaft 39 and rods 48 and 49. The shaft 23, rotated by the gear 21 22, as already stated, causes the cam 24 to lift the levers 25 and 26. The lever 25 by means of its fork 27 lifts the lever 13, while the lever 6 through the intervention of the pawl 5 imparts rotary motion to the card-chain 1. The lever 13 by resting upon the cards has its vertical arm 30 removed out of contact with the lever 31, and the notch 56 in this latter is therefore disengaged from the edge of the fork of the lever 26. The latter oscillates freely through the action of the cam 24. At the moment when the empty shuttle reënters the upper groove 43 of the drum 42 the card 7, Fig. 5, of the card-chain 1 presents its perforation 9 beneath the pin 11 of the lever 13. The said pin then falls into the hole, and in consequence of the oscillation resulting therefrom of the lever 13 upon its pivot 29 its arm is caused to strike against the upper end of the lever 31, thus forcing the notch 56 into engagement with the edge of the fork 54 of the lever 26. This latter at that moment is raised by the cam 24 at the end of the shaft 23 and takes with it the lever 31, which thereby acts upon the end of the lever 33 and causes it to swing on the pin 34 and with its rear end 35 to pull down the rod 36, provided with the hook 37, so as to bring the latter into contact with one of the pins 62, fixed between the disks 38. This imparts a sudden rotary motion to the said disks, and consequently to their shaft 39 and drum 42, so that the shuttle in the upper groove 43, which has previously served, will be moved out of the plane passing through the axis 39 and guide 48 of the driver, and another shuttle provided in the next groove 43 of the drum 42 will be brought into the position in which the driver in the next pick will actuate the same, the rotation of the drum 42 being limited, on the one hand, by a spring-stop 51, adapted to act upon the cam 50, and, on the other hand, by the hook 61 of the rod 60 engaging one of the pins 62 of the disks 38 when the said hook 61 is pulled downward on account of the oscillation of lever 59, caused through the action on the said lever of a pin 170, fitted on lever 33, this action taking place at the moment that the lever 33 swings on pin 34. It will be readily seen that by means of this instantaneously-acting mechanism, in combination with the arrangement of card-chain hereinbefore described, the changing of the shuttle can be effected between two successive picks without fear of losing one during the time the empty shuttle reënters the groove 43 of the drum 42, and the fresh shuttle brought into line by the rotation of the drum is in turn operated by the driver.

I will now describe the mechanism employed for supplying the drum with a fresh shuttle immediately after the empty shuttle has been replaced and for removing this latter from the drum.

In line with the groove of the drum containing, say, the shuttle 142, Fig. 6, for replacing the shuttle 143 last employed, there is arranged a box 64, Figs. 1, 3, 4, 6, and 8, capable of holding a shuttle, and such box is fixed, on the one hand, to the oscillating upright 40 and, on the other hand, to the plate 45, which serves to support the bracket 46. Thus box 64, which oscillates with the batten, is open at its top and is connected, by means of hinges 65, Figs. 2 and 8, to a box 66, capable of holding a number of superposed shuttles. The box 66 is maintained in position by two rods 67, formed with slides 68, working upon a transverse bar 69, fixed between two supports 70, secured to the standards 3 and 14 of the frame. The rods 67 are attached, by means of springs 71, to a stationary cross-piece of any convenient description. Owing to this arrangement, when the box 64 follows the batten and upright 40 in their oscillatory motion the box 66 is slightly displaced upon the transverse bar 69, thus causing the hinges 65, Figs. 2 and 8, to open slightly. The shuttles are retained in the box 66 by the aid of two systems of stop-rods 72 73, Figs. 1, 2, and 3, oscillating upon pivots 74 75, carried by supports 76, fixed to the lateral sides of the box 66. I will hereinafter explain the manner of operating the box 66 at the desired moment and the disengagement of the shuttle, which is to enter the lower box 66. I will suppose that the box 64 contains a shuttle 142, for example, ready to be moved forward into one of the grooves of the drum 42, which operation is effected in the following manner: As hereinbefore stated, there is arranged at the side of the lever 13, Figs. 1, 2, 4, and 5, for operating the mechanism for rotating the drum a second lever 6 of similar form and which is also raised at each revolution of the shaft 23 through the intervention of the cam 24 and vertical lever 25. This lever 6 is fitted, as aforesaid, with the pin 12, adapted to rest upon the cards of the card-chain 1, as well as with a pawl 5, adapted to actuate a ratchet 4 and cause the advance of the chain. This lever is further furnished, like the lever 13, with a vertical arm 77, Fig. 2. Opposite the lower extremity of this vertical arm 77 there is a lever 78, Fig. 2, similar to the lever 31, and, like it, passing through the fork 54 of the lever 26. The said lever is connected by its lower end to a lever 79, Figs. 2, 3, and 4, adapted to oscillate like the lever 33 upon the pivot 34 and having an arm projecting beyond the said pivot. Upon the prolongation of this arm 79, Figs. 3 and 4, is fixed, by means of hinges 80, Fig. 3, a small oscillatory link 81, attached at its upper end by means of an articulated connection 82 to a bent lever 83, which rocks on a pivot 84, fixed to the standard 3 of the frame. The vertical arm of this bent lever 83, Figs. 2 and 3, has its end located beneath a rod 85, connected by a hinge-joint 86 to a rod 87, fitted at its free end with a stud 88, adjustably engaged in a slotted guide 89, fixed to the standard 3 of the frame. The rod 85 is fitted in a sleeve 90, oscillating at 91, Fig. 3, at the extremity of a lever 92, Fig. 4, forming the horizontal prolongation of a forked lever 93, Figs. 2 and 3, which latter is pivoted at 94 to an appropriate support 95 and embraces by means of its forked end the sleeve 96, Figs. 2, 3, and 4, of a clutch 97 98, fast upon the shaft 23. The driven part 98 of this clutch is integral with a gear-wheel 99, Figs. 2 and 3, actuating a toothed wheel 100, mounted on a trunnion 101, provided in a bracket 102. Upon the trunnion 101, at the side of the gear-wheel 100, is mounted a beveled pinion 103, driving a similar pinion 104, Figs. 2 and 4, fast upon a spindle 105, arranged at right angles to the driving-shaft of the loom. This spindle 105 is carried in an adjustable bracket 106 and is fitted at its outer end in front of the loom, Fig. 3, with a toothed pinion 107, Figs. 3 and 4, which gears with a toothed wheel 108 upon a shaft 109, provided with a disk 110. This latter is connected, by means of a crank and adjustable rod 111 and double hinges 112 and 113, to a lever 114, oscillating at 115 upon a support 116, having for its center the shaft 117, which forms the fulcrum of oscillations for the rocking upright 40. The said lever 114 engages in a sheath or sleeve 118, Figs. 2, 3, and 7, joined, by means of a double hinge 119, to a flier 120, Figs. 6, 7, and 8, adapted to slide upon two rods 121 122, fixed at one end to the oscillating upright 40 and at the other end to the plate 45, integral with the prolongation 44 of the batten 18. The said flier 120 is constructed, as shown in Fig. 8, in the form of a fork, and is thus enabled while sliding upon the rods 121 122 to pass beneath the sleeve 46 of the support 47 of the assembling-rod 49. The flier carries at its side adjacent to the box 64 a tappet 123, of wood, sliding in a lateral groove provided in the box 64, and at its other side it carries a support 124, fitted with a hook 125, which is arranged to swing on an axis 126 and is retained in an approximately horizontal position by means of a small counterweight 127, for example. The aforesaid rod 85, Figs. 2 and 3, which engages in the oscillating sleeve 90, carried by the extremity of the horizontal arm 92 of the fork 93 of the clutch 97 98, is capable of displacement in the oscillating sleeve 90 by compressing a spring 128 by means of screw-nuts 129 upon the rod 85. Between these screw-nuts 129 there is secured a rod 130, Figs. 2 and 3, which is connected to the end of a lever 131, pivoted at 132 and provided with a nose 133, so arranged as to be in the path of a roller 134, carried upon the face of the disk 110. This disk 110 is formed with a peripheral ratchet-tooth 135, with which engages a hook 136, as shown in Fig. 3, adapted to swing on a pivot-pin 137, carried in a slotted guide 138, fixed to the standard 14 of the frame of the loom. The hook 136 is attached by a cord 139 to the vertical end of the bent lever 83. The operation of this feed mechanism is as follows: Directly the card 7, Fig. 5, of the card-chain has started the mechanism hereinbefore described for rotating the drum 42 the pawl 5 causes the ratchet-wheel 4 to revolve and so move the chain to place the next card 8 beneath the levers 6 and 13. The pin 12 of the lever 6 falls into the hole 10, Fig. 5, of this card 8, and owing to the descending motion the vertical arm 77 of this lever 6 is caused to strike the upper end of the lever 78. This lever 78 by means of a notch similar to the notch 56 of the lever 31 engages the edge of the fork 54 of the lever 26, and the latter being raised by the cam 24 now lifts the lever 78, which acts upon the rocking lever 79, Fig. 2, and causes the arm thereof beyond the axis 34 to descend, thereby lowering the link 81, which through the intervention of the articulated joint 82 pulls down the horizontal arm of the lever 83. The vertical arm of this lever 83 rises with a jerk, pulls the cord 139, and disengages the hook 136 from the tooth 135 in the periphery of the disk 110. Simultaneously the vertical arm of this lever 83 strikes the rod 85, causing it to oscillate at 91 with its sleeve 90. A forked extremity 140 of this rod 85 while oscillating at 86 sets upon the lever 87 in such a manner that the levers 85 87 are brought into alinement with the center of rotation 91 of the sleeve 90 and stud 88 of the rod 87. This displacement of the levers 85 and 87, Fig. 3, has the effect of increasing the distance between the points 91 and 88, so that the sleeve 90 is forced toward the left, and in this movement it takes with it the forked lever 93, and consequently also the sleeve 96 of the part 97 of the clutch, which latter engages with the part 98. The part 98 is thus rotated by the part 97, which latter revolves with the shaft 23, receiving its motion, as already stated, from the driving-shaft 16 by means of the gear-wheels 21 and 22. The driven part 98 of the clutch being thus set revolving actuates by means of the gear-wheels 99 and 100 and beveled pinion 103 the beveled wheel 104 and the small transverse shaft 105, which latter by means of toothed wheels 107 and 108 rotates the disk 110. This latter can now turn in the direction indicated by the arrow 141, Fig. 3, owing to the disengagement of the hook 136 from the tooth 135 through the pull of the cord 129 upon the said hook during the upstroke of the vertical arm of the elbow-lever 83. The revolution of the disk 110 causes the crank-rod 111 to oscillate the lever 114 upon its pivot 115. Starting from the position shown in Fig. 3 the lever 114 in half-revolution of the disk 110 moves the flier 120 into the position shown in dotted lines in Fig. 7. During this displacement the flier 120 slides upon the rods 121 122, the sheath or housing 118 compensating for the difference in the radius by permitting the lever 114 to slide therein. The flier 120, traveling along the rods 121 122, Figs. 6 and 7, pushes the shuttle 142, for example, which is in the box 64 and causes it to enter the groove 43 in the drum 42, which is then adjacent to the open end of the said box. Simultaneously the hook 125 engages the point of the empty shuttle 144, for example, which is located in the groove 43 opposite to that into which the fresh shuttle 142 is introduced. The hook 125 slides along the point of this shuttle 144 and engages, as shown in dotted lines, Fig. 7, in a notch 145, Fig. 9, provided in the side of the said shuttle. In this manner it seizes the shuttle and draws it along in its return motion during the second half-revolution of the disk 110, which drives the flier back to its initial position. (Shown in Fig. 7.) The shuttle 144 on leaving the drum 42 encounters a plate 146, Figs. 2, 3, and 7, passes along the same, and falls into a box designed to receive it, the lever 114 having returned the flier 120 to its original position, and thereby furnished a fresh shuttle to the drum 42 and removed therefrom the empty shuttle, while the disk 110, controlled by the clutch 97 and 98, performs one complete revolution. At that moment the roller 134, carried on the face of the disk 110, engages with the nose 133 of the lever 131, Figs. 2 and 3, causing this lever to oscillate on its pivot 132, producing a pull upon the rod 130, secured between the screw-nuts 129 of the lever 85. This movement returns the lever 85, together with the forked lever 93 and the sleeve 96 of the clutch, toward the right, thereby releasing the friction-drum 97 of the driven part 98 and stopping the disk 110. At the same time the oscillating lever 79, previously depressed by the pull on the lever 78, is returned to its initial position by the action of the return-spring 148, Fig. 3, and the bent lever 83 slackens the cord 139, which allows the hook 136 to fall against the periphery of the disk 110. This latter having completed its revolution and the roller having passed the nose 133 of the lever 131, the tooth 136 reëngages in the extremity of the hook 136, so arresting in a definite manner the movement of the disk, and thereby keeping the flier 120 stationary until the shuttle 143, Fig. 6, for example, is empty and the drum rotates, as before described, to substitute the shuttle 142 for the shuttle 143, whereupon it is required to restart the feed mechanism in order to deliver a fresh shuttle to the drum and to remove the empty one therefrom.

The feeding of the shuttle into the box 64 takes place in the following manner: As hereinbefore described, the reserve shuttles are located in the box 66, wherein they are retained by a double system of retaining-catches 72 73. These catches are fast on their spindles 74 75, which latter are fitted at their ends with rods 148 and 149, respectively. The ends of these rods are attached by means of cords 150 and 151 to the oscillating levers 38 and 79, and the said rods are also subjected to the action of the spring-rods 152 and 153 for the purpose of retaining them in their normal position, such spring-rods being fixed to a cross-bar 154, carried by horizontal arms of the supports 70. When the fore end of the lever 33 is depressed for actuating the drum through the intervention of the rod 36, the said lever 33 pulls the cord 150, so as to depress the bar 148 and remove the retaining-catch 73 from the interior of the box 66 in such a manner as to free the shuttle resting on such catch and so allow it to fall into the box 64, while the shuttle above it is retained by the horizontal branch of the catch 72. When the lever 79 is depressed in its turn, as hereinbefore explained, so as to effect the coupling of the clutch, and consequently the displacement of the flier 120, which pushes the shuttle into the drum, the pull of such lever 79 on the cord 151 effects the oscillation of the bar 149, which thereupon removes the catch 72 from the box 66, thus permitting a fresh shuttle to fall upon the retaining-catch 73, where it is retained till another depression of the lever 33, controlling the drum, takes place and allows the shuttle to fall into the box 64.

In the preceding description it has been supposed that the shuttle contained in the topmost groove 43 of the drum is shot into the opening of the shed by the driver sliding over the guide-rod 48 and operated in a well-known manner. It is, however, necessary when throwing a fresh shuttle for the first time to enable the end of the thread thereof to be automatically retained, and to this end the shuttle is provided, as shown in Figs. 10 and 11, with a small ring 157, disposed in the groove of the shuttle, where it is retained by a spring 158. The end 155 of the thread of the shuttle after having been passed through the eye 156 is attached to the said ring 157. As shown in Fig. 3, on the batten 18 is fixed a hook 159, disposed with its point in front of the ring 157 on the shuttle, so that when the shuttle is thrown for the first time the ring 157 is retained by the hook 159 after having disengaged it from the spring 158, the end of the thread being also thereby retained. In order to prevent the shuttle during its removal from the drum 42 from remaining attached to the weft, owing to the small amount of thread left therein, I attach to the batten 18 a pair of scissors 161, as shown in Fig. 12, one blade of such scissors being rigidly fixed in a vertical position to a bracket 160, secured to the batten, and the other blade being located in a groove 162 in the batten. This latter blade is retained in the groove by the action of a spring 163, and it is connected by a cord 164 or any other appropriate means to the lever 33, which actuates the drum 42. In this manner each time the drum is actuated the horizontally-disposed blade of the scissors 161 is suddenly operated, so as to cut the thread which is still attached to the shuttle.

It will be understood that with the arrangement hereinbefore described loss of pick cannot occur, owing to the novel and special relation between the length of the card-chain and the length of the thread on the shuttle, while, moreover, the drum will always be recharged long before it is rotated. This is a very important point considering the great speed at which certain looms are driven. In the present case where the clutch and by it the feed mechanism is set in motion immediately after each rotary motion of the drum it will be obvious that this feed operation may be carried out, relatively speaking, in a gradual manner, since it may be extended over the whole of the time required for the consumption of all the thread carried in the shuttle. The result will be a greater safety in working than has heretofore been attained with any other arrangement for this purpose, all such arrangements having the inconvenience, as already stated, of being operated by the control of the feelers of the weft, while, moreover, having to change and feed or replace the shuttle within the exceedingly short space of time comprised between two successive picks.

What I claim is—

1. In a device for enabling the empty shuttle of a loom to be automatically replaced by a fresh one when the weft-thread has run out, in combination with a mechanism for changing the shuttle, a shuttle having a predetermined length of thread, a card-chain effecting a complete displacement during the time occupied in using nearly the said predetermined length of the shuttle-thread, means for actuating the changing mechanism by aid of the said card-chain, means for actuating a clutch by aid of the said card-chain immediately after the changing mechanism has been operated, a clutch, a disk momentarily actuated by said clutch, a flier, operative connections between the said disk and flier by which the flier is caused to slide on suitable guide-rods and to feed the changing mechanism with a new shuttle, and means for releasing the clutch and stopping the movement of the flier substantially as described and for the purpose set forth.

2. In a device for enabling the empty shuttle of a loom to be automatically replaced by a fresh one when the weft-thread has run out in combination with a mechanism for changing the shuttle, a feed mechanism comprising a card-chain, a hole in one of the cards of the said card-chain, a lever 6 fitted with a pin 12 adapted to rest upon the cards of the card-chain a lever 78 adapted to be actuated by the said lever 6 at the moment when the pin 12 falls into the hole of the card-chain, an oscillating lever 79 connected to the said lever 78, means for oscillating the said lever 79 a bent lever 83 actuated by the said oscillating lever 79 a rod 85 fitted with a hinge-joint and connected to the forked lever 93 of the sleeve of a clutch, a clutch 97 98 a disk 110 gear-wheels connecting in an operative manner the said disk 110 with the clutch, a flier, means for actuating the flier by aid of the said disk and means for releasing the clutch and stopping the disk and the flier after the flier has been operated, substantially as described and for the purpose set forth.

3. In a device for enabling the empty shuttle of a loom to be automatically replaced by a fresh one when the weft-thread has run out, in combination a card-chain, a changing mechanism actuated by the said card-chain a feed mechanism also actuated by the said card-chain and comprising a clutch, means for actuating the said clutch, a disk operated by the said clutch and actuating a flier adapted to furnish a fresh shuttle to the changing mechanism, a roller 134 on one face of the disk 110 an oscillating lever 131 fitted with a nose adapted to be acted upon by the roller 134 of the disk, a connection between the said lever and the means for actuating the clutch so as to release the same and stop the disk 110 when the roller of the said disk engages with the nose of the oscillating lever 131 and means for stopping effectively the movement of the disk substantially as described and for the purpose set forth.

4. In a device for enabling the empty shuttle of a loom to be automatically replaced by a fresh one when the weft-thread has run out, a changing mechanism, a feed mechanism, a card-chain actuating successively the changing and the feeding mechanisms, a box 64 oscillating with the batten of the loom and capable of holding a shuttle and from which the fresh shuttle is pushed into the changing mechanism by aid of the feed mechanism, a box 66 capable of holding a number of superposed shuttles, hinges connecting the said box 66 to the box 64 and means to deliver a shuttle from the box 66 to the box 64 after a fresh shuttle has been furnished to the changing mechanism, substantially as described and for the purpose set forth.

5. In a device for enabling the empty shuttle of a loom to be automatically replaced by a fresh one when the weft-thread has run out, a changing mechanism, a feed mechanism, a card-chain actuating successively the changing and feeding mechanisms, a box 64 oscillating with the batten of the loom and capable of holding a shuttle and from which the fresh shuttle is pushed into the changing mechanism by aid of the feed mechanism a hinged box 66 capable of holding a number of superposed shuttles, hinges connecting the said box 66 to the box 64 a double system of retaining-catches 72 73 and means for actuating successively the said catches in correspondence with the action of the changing and feeding mechanisms, substantially as described and for the purpose set forth.

6. In a device for enabling the empty shuttle of a loom to be automatically replaced by a fresh one when the weft-thread has run out, in combination, a changing mechanism, a feed mechanism, substantially as described, a box capable of holding a shuttle, a flier carrying at its side adjacent to the box, a tappet sliding in a lateral groove of the said box, and at its other side a support 124 fitted with a swinging hook 125 adapted to remove the empty shuttle from the changing mechanism rods upon which the said flier slides and means for actuating the said flier by aid of the feed mechanism, substantially as described.

In witness whereof I have hereunto set my hand in presence of two witnesses.

PAUL CLÉMENT.

Witnesses:
ALFRED C. HARRISON,
V. DUNNE.